United States Patent [19]

Ahuja et al.

[11] 4,414,628
[45] Nov. 8, 1983

[54] SYSTEM FOR DISPLAYING OVERLAPPING PAGES OF INFORMATION

[75] Inventors: Sudhir R. Ahuja, Aberdeen; Dhiraj K. Sharma, Gillette, both of N.J.

[73] Assignee: Bell Telephone Laboratories, Incorporated, Murray Hill, N.J.

[21] Appl. No.: 249,505

[22] Filed: Mar. 31, 1981

[51] Int. Cl.³ .............................................. G06K 15/18
[52] U.S. Cl. .................................... 364/200; 340/789; 340/711; 340/721; 364/900
[58] Field of Search ............... 364/200, 900; 340/705, 340/718, 721, 723, 724, 750, 802, 722, 726, 703

[56] References Cited

U.S. PATENT DOCUMENTS

| | | | |
|---|---|---|---|
| 3,643,252 | 2/1972 | Roberts | 340/726 |
| 3,648,250 | 3/1972 | Low et al. | 364/200 |
| 3,778,811 | 12/1973 | Gicca et al. | 340/722 |
| 3,781,850 | 12/1973 | Gicca | 340/722 |
| 3,792,462 | 2/1974 | Casey et al. | 340/721 |
| 3,818,461 | 6/1974 | Ward et al. | 364/900 |
| 3,848,232 | 11/1974 | Leibler et al. | 364/200 |
| 3,891,792 | 6/1975 | Kimura | 340/726 |
| 3,911,403 | 10/1975 | O'Neil, Jr. | 364/900 |
| 3,921,148 | 11/1975 | Ophir et al. | 364/900 |
| 4,070,710 | 1/1978 | Sukonick et al. | 364/200 |
| 4,103,331 | 7/1978 | Thacker | 364/200 |
| 4,110,823 | 8/1978 | Cronshaw et al. | 364/200 |
| 4,191,956 | 3/1980 | Groothuis | 364/900 |
| 4,204,206 | 5/1980 | Bakula et al. | 340/721 |
| 4,214,303 | 7/1980 | Joyce et al. | 364/200 |

OTHER PUBLICATIONS

Datamation, May, 1979, R. G. Shoup, pp. 150-156, "Superpaint . . . The Digital Animator".
Computer, Mar. 1977, Kay et al., pp. 31-41, "Personal Dynamic Media".

Primary Examiner—Mark E. Nusbaum
Assistant Examiner—Jameson Lee
Attorney, Agent, or Firm—Roy C. Lipton

[57] ABSTRACT

Various size frames or pages of information elements stored in a computer system can be simultaneously displayed on a screen-based terminal. The computer processor identifies the screen position the user selects for each of the stored pages and the top-to-bottom order of the pages with respect to visibility in the event that pages overlap. The processor selects the pages in descending order, topmost page first. Information elements of selected pages are transferred to appropriate locations in a display memory only in the event that an auxiliary memory registers that an information element has not priorly been transferred to those locations. After all the pages are transferred, background data is written into each display memory location that the auxiliary memory registers as not having an information element transferred thereto. The display memory is scanned in a conventional manner to apply the display information therein to the viewing screen.

10 Claims, 3 Drawing Figures

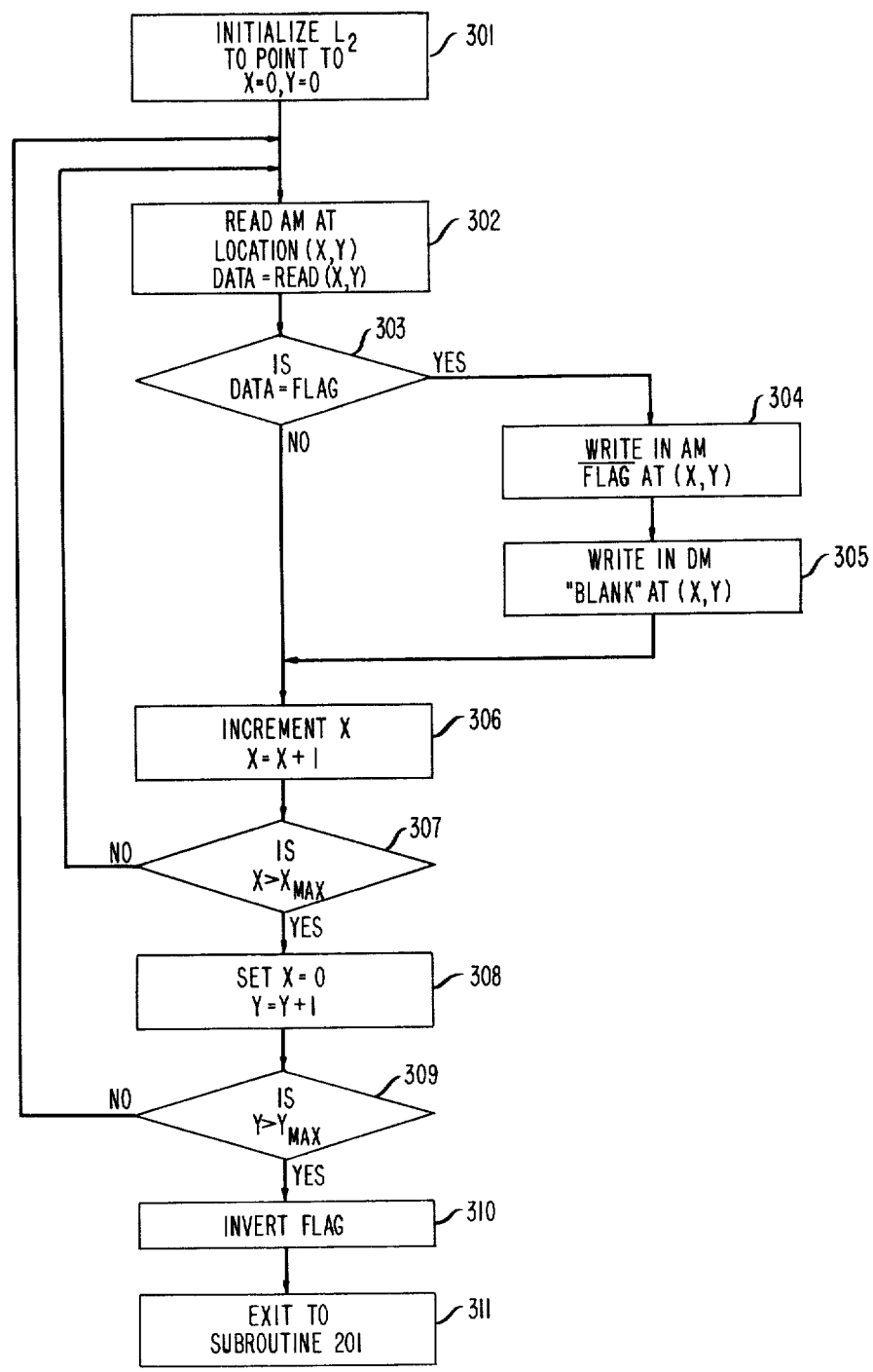

SYSTEM FOR DISPLAYING OVERLAPPING PAGES OF INFORMATION

TECHNICAL FIELD

This invention relates to storage of information for display on a screen based terminal and, more particularly, to storage of information elements arranged in various size frames or pages which can be displayed simultaneously.

BACKGROUND OF THE INVENTION

It is now conventional for users of interactive computer systems to employ screen based terminals for viewing and manipulating information stored or generated by the computer. This information may constitute text, graphics, facsimile, video, et cetera and conceptually the information can normally reside (or be stored) as display data in files, in the computer or in the terminal itself. It is straightforward to develop computer processes that provide manipulation of any of these forms of data. This manipulation includes displaying the elements of the information in any locations on the viewing screen and relocating the display of the information to any other screen locations.

One scheme for enabling viewing of information is implemented by using objects called pages or frames wherein a page (or frame) is a desired portion of a file of display data (sometimes called a working window onto the file). The screen areas that these pages require to display the information in the pages are of various configurations and sizes which are advantageously a portion or fraction of the size of the viewing screen. Information elements in a page can be placed in any location of the viewing screen and can also be moved around on the screen. At any given time, the page may be fully or partially visible on the screen depending on its location relative to the boundaries of the screen.

In certain computer systems, a plurality of pages can be simultaneously displayed on the viewing screen. Each of these pages can be placed in any location and moved about on the display screen. Pages may be designated as being on top of or below other pages with respect to the user's visibility so that in the event that portions of two or more pages overlap on the screen, only information in the upper page portion is displayed. Information in an overlapped portion of a lower page must be removed or hidden from the user's view.

In a known implementation, a buffer or frame memory stores the various size pages and, under processor control, this stored information is periodically changed by adding new pages and deleting old ones. The user communicates with the processor to update the screen image by identifying which pages in the frame memory are to be displayed by identifiying the location that each page is to assume on the screen and by designating each of the several pages as being on top of or below other pages. Periodically and/or each time the image is updated, the processor transfers the information in the identified pages from the frame memory to appropriate locations in a display memory whose storage size and configuration is appropriate for the size and configuration of the screen. The transfer process also provides for removing the information from the overlapped portions of lower pages. The display memory is periodically scanned and the information in this memory is displayed on the display screen, information in upper pages being visible to the user and information in overlapped portions of lower pages being hidden from view. In this known implementation, however, the transfer processing from the frame memory to the display memory is complex and time consuming.

It may be apparent to those skilled in the art that an alternate transfer scheme would constitute transferring the several pages to the display memory in an ascending bottom-to-top order. The information in the topmost page, transferred last, thus overwrites the information in lower overlapped page portions. However, scannings of the display memory during the data transfer process cause the momentary display of the information from lower overlapped page portions (before this data is overwritten) resulting in undesirable screen flicker.

It is an object of this invention to provide transfer processing which is simple and rapid and does not result in the above-described screen flicker.

SUMMARY OF THE INVENTION

This invention fulfills the above-disclosed objects by selecting pages in the frame memory for transfer in descending order, topmost page first, by writing an information element of the selected page into an appropriate location of the display memory when an auxiliary memory registers that an information element has not priorly been transferred to such display memory location and by registering in the auxiliary memory that an information element has now been transferred to such location. It is a feature of this invention that writing of the information element into the appropriate position of the display memory is prevented when the auxiliary memory registers that an information element has priorly been transferred to the display memory location. A simple, rapid method is thus provided for precluding the transfer of information in overlapped lower pages to the display memory and, at the same time, for eliminating screen flicker.

After the pages are transferred, it is necessary that display memory location not having information transferred thereto be cleared of information elements written in a previous transfer process. This is conventionally arranged by writing "background" (or blank) information into such locations. It is a further feature of this invention that background information is inserted into locations of the display memory after all of the selected pages are transferred when the auxiliary memory registers that information elements have not priorly been transferred to those locations. Background data is thus written into the display memory in a simple manner.

The foregoing and other objects and features of the invention will be more fully understood from the following description of an illustrative embodiment taken in conjunction with the accompanying drawings.

BRIEF DESCRIPTION OF THE DRAWING

In the drawings,

FIG. 3 depicts a flowchart showing a method of writing background information into the display memory in accordance with this invention.

DETAILED DESCRIPTION

Figure 1:
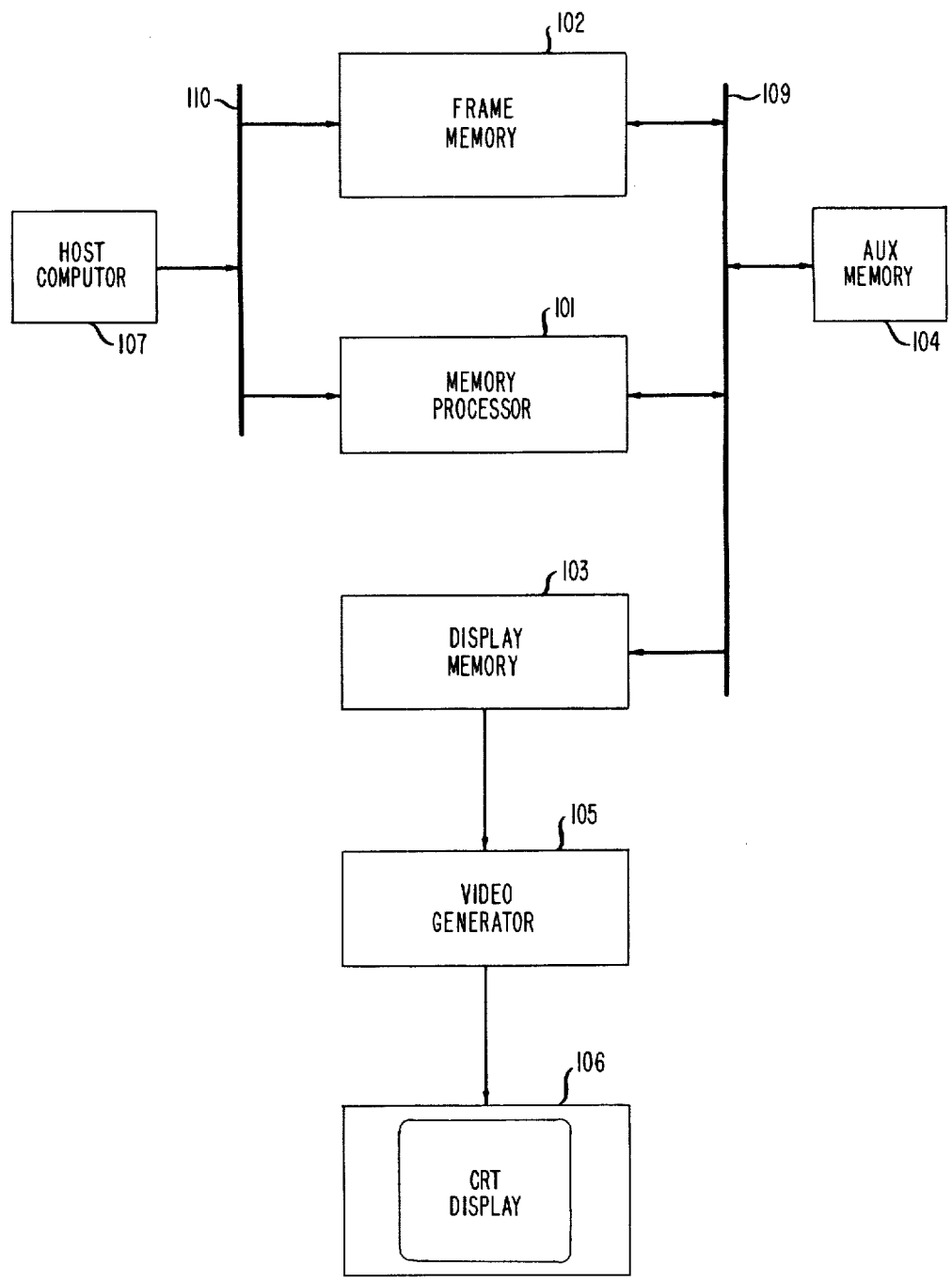
FIG. 1 discloses, in block form, the various circuits which form a system for displaying overlapping pages of information in accordance with this invention.

The basic elements employed in the overall processing system shown in FIG. 1 comprise frame memory 102, display memory 103, auxiliary memory 104, memory processor 101, video generator 105, cathode ray display 106 and bus 109. The information to be displayed and the arrangement of the display information on the display is provided by host computer 107 which interacts with memory processor 101 and frame memory 102 by way of bus 110.

Frame memory 102 comprises a random access memory having a sufficient storage space to store the data in a plurality of pages of display information. A page of information may constitute text, graphic, video or other information which, when displayed on cathode ray tube display 106, covers an area of fixed dimensions. This page area generally has rectangular shape which is typically a portion or fraction of the total display area that can be accommodated by display 106.

Display memory 103 comprises a random access memory having a plurality of storage locations for storing information elements. The storage area is adequate for storing information that, when displayed, will cover a display area which corresponds to the display area of cathode ray tube display 106. Auxiliary memory 104 comprises a random access memory having a storage area adequate for storing data bits for registering whether or not information elements have been transferred to the several locations of display memory 103. Each of the bit storage positions of auxiliary memory 104 may therefore advantageously be deemed to correspond to each of the locations of display memory 103.

Video generator 105 periodically scans display memory 103 taking the information therefrom and displaying it on cathode ray tube 106. Video generator 105 provides all of the conventional functions of refreshing, deflecting, blanking and so on to provide a steady and continuous display on cathode ray tube display 106.

Memory processor 101 comprises a high speed processor or microcomputer that interacts with frame memory 102, display memory 103 and auxiliary memory 104 to obtain pages of information from frame memory 102 and place them in appropriate locations in display memory 103. For each display of information that is to be placed on display 106, memory processor 101 is provided, by external sources such as host computer 107, with the identification of each of the pages in frame memory 102 that are to be displayed, the locations of all of the data information elements of each such page in frame memory 102, the locations that the data information elements of the page are to occupy in display memory 103 and the relative top-to-bottom visibility order of the placement of the several pages.

In order to start up the system all of the binary bits stored in auxiliary memory 104 must be placed in the same binary condition. At the same time, an internal flag bit in memory processor 101 must also be set to a corresponding condition. It is a general function of memory processor 101 for this start-up condition to insert bits of one condition, such as "0" bits, into all storage positions of auxiliary memory 104 and to concurrently set the internal flag to "0".

Another general function of memory processor 101 is to update display memory 103 by transferring each page of information that is to be displayed from frame memory 102 to display memory 103, starting with the topmost page. This updating function may be initiated after memory processor 101 has started up the system, as described above. Alternatively, the update function may be initiated when host computer 107 instructs memory processor 101 to change the display by adding, deleting or moving displayed pages or may be initiated by instructions or timing signals arranged to follow completion of a prior updating or transfer cycle or may be initiated by any other conventional means. In any event, upon such an initiation of a transfer cycle, memory processor 101 sequentially obtains from frame memory 102 the display information elements from each page which is to be displayed starting with the topmost page and continuing with each successive lower page.

As each information element is obtained from frame memory 102, memory processor 101 interacts with auxiliary memory 104 and with its internal flag bit to determine whether or not the information element is to be written into display memory 103. More specifically, as each information element is obtained from frame memory 102, memory processor 101 accesses the position of auxiliary memory 104 corresponding to the display memory location to which the information element is destined to occupy. The condition of the information bit in the position of memory 104 thus accessed is determined and compared with the flag bit. If there is correspondence between the condition of the auxiliary memory 104 bit and the flag bit indicating that information was not priorly written into the corresponding display memory 103 location, the information element is written into this display memory location and the value or condition of the bit in the auxiliary memory location is switched. On the other hand, if the accessed auxiliary memory bit condition was priorly modified, there is a comparison mismatch with the flag bit and the writing of the information element into the display memory location is precluded.

In the present situation with respect to the topmost page and under the condition that this transfer cycle is initiated by the above-described start-up, all of the locations in auxiliary memory 104 have "0" bits therein and the internal flag of memory processor 101 has been set to "0" as described above. Each information element of this topmost page is therefore written into display memory 103 and memory processor 101 writes a "1" bit into each corresponding location of auxiliary memory 104. Subsequently, when a lower page is being obtained from frame memory 102, in the event that this lower page has a portion overlapped by an upper page, the information element obtained from this lower page portion will be destined to occupy a position in display memory 103 whose corresponding position in auxiliary memory 104 has a "1" bit stored therein. In this event, when memory processor 101 accesses this position of auxiliary memory 104 and determines that the bit therein does not correspond to the internal flag bit, memory processor 101 precludes the writing of the information element into display memory 103.

After the transfer of all of the pages of information to be displayed to display memory 103, memory processor 101 proceeds to the general function of writing background information. More specifically, memory processor 101 interacts with auxiliary memory 104 to determine which storage locations of the display memory 103 do not have information from these pages, and upon determining which are the "empty" locations, memory processor 101 writes background information into the corresponding locations of display memory 103. Memory processor 101 concurrently writes "1" bits into the corresponding locations of auxiliary memory 104.

The full memory display transfer cycle is completed upon this writing of the background information, and memory processor 101 toggles the flag bit from a "0" bit to a "1" bit and goes back to the general function of transferring the pages of information, topmost page first, from frame memory 102 to display memory 103, interacting with auxiliary memory 104 to determine whether to transfer or not to transfer the information in the overlapping pages (as presently designated by host computer 107). In this case, since the internal flag is now a "1" bit, information is transferred if a "1" bit is stored in auxiliary memory 104 and blocked if a "0" bit is stored in memory 104 and, if the information is transferred, a "0" bit is overwritten into the memory 104 location.

As previously noted, data describing each of the pages to be displayed including the identification of those pages to be displayed, the location and size of these several pages in frame memory 102, the location in the display memory 103 that each page is to be placed and the top-to-bottom placement of these several pages is provdied to memory processor 101 by external sources, such as host computer 107, by way of bus 110. In addition, host computer 107 inserts the appropriate display information into frame memory 102, which display information comprises the plurality of pages of display information. This display information is entered into a frame memory 102 in a conventional manner which, for example, can be the manner display information is entered into RAM memory 301 of a display processing system disclosed in FIG. 3 of U.S. Pat. No. 4,110,823 issued Aug. 29, 1978 to D. Cronshaw, J. E. Shemer, W. D. Turner, D. Hartke, J. R. Keddy, W. E. DuVall and W. M. Sterling. Transferring of information from display memory 103 to display 106 by virtue of the scanning of video generator 105 is also handled in a conventional manner which, for example, can correspond to the manner in which information is transferred from fax memory 111 to display 101 in FIG. 4 of U.S. Pat. No. 4,110,823. The manner in which information from any one page is transferred from frame memory 102 to display memory 103 is also considered conventional with the exception of the determination by memory processor 101 as to whether information will be blocked or stored in accordance with interaction with auxiliary memory 104 and as to whether background information is to be written into display memory 103.

Figure 2:
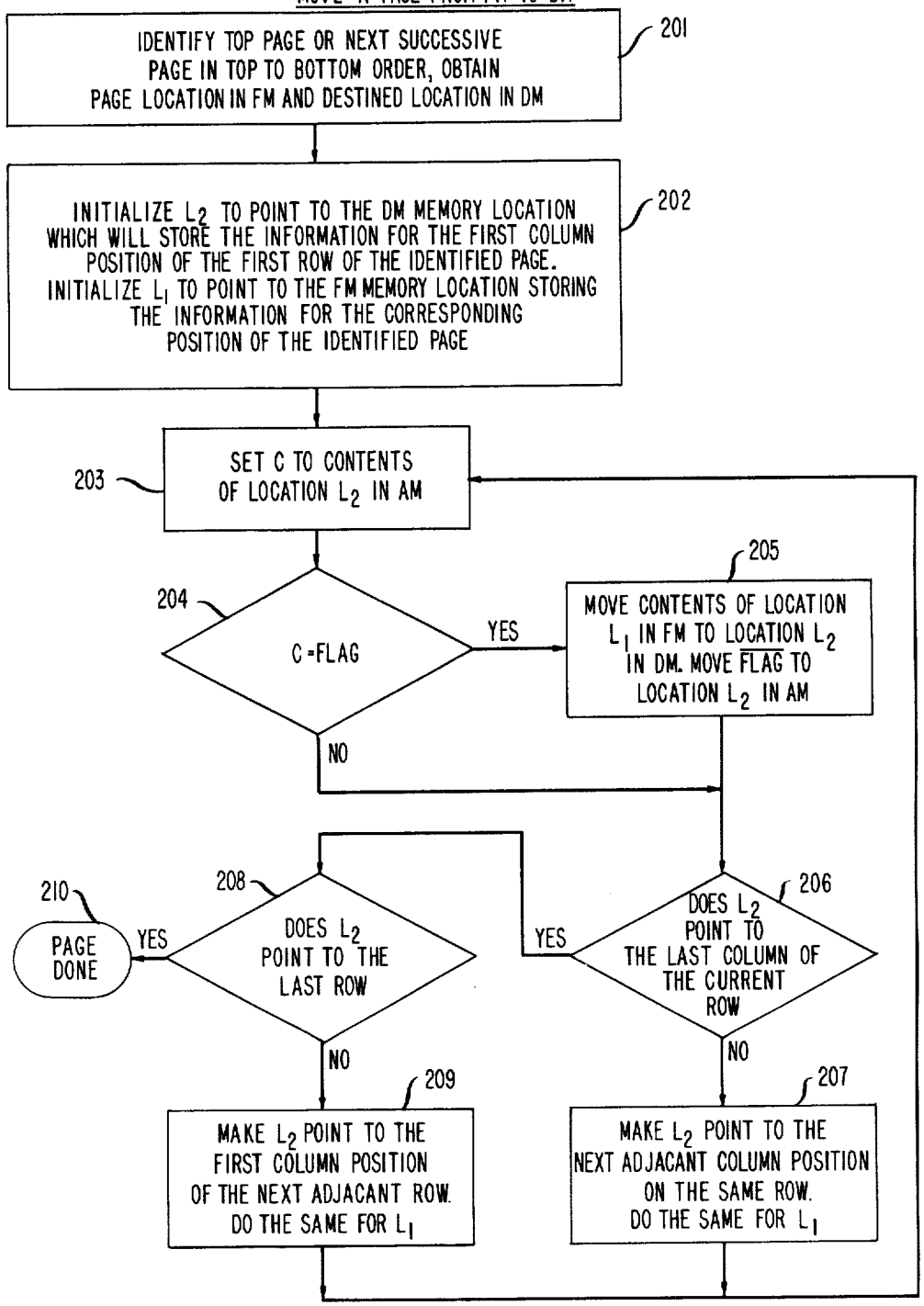
FIG. 2 depcits a flowchart disclosing the method of transferring information elements of a page from the frame memory to the display memory.

The functions provided by memory processor 101 are advantageously determined by a program stored internally therein. The program routines for moving a page from frame memory 102 to display memory 103 can be readily implemented from the process, described below, which details the various steps taken by memory processor 101 when interacting with the other components of the system. The flowchart for this process or algorithm for moving a page from frame memory 102 to display memory 103 is depicted in FIG. 2.

In the initial subroutine 201, the top page identification is obtained from the information provided by host computer 107 or, alternatively, if a page has priorly been moved to display memory 103, then the next successive page in the top-to-bottom order is identified. The location of the identified page in frame memory 102 and the destined location of the page in display memory 103 is then obtained from the information provided by host computer 107. The process then advances to subroutine 202.

In subroutine 202, a pointer identified as pointer $L_2$ is arranged to point to the display memory 103 location which will store the information from the first column position of the first row of the identified page. Another pointer, identified as pointer $L_1$, is set to point to the frame memory location storing this information (in the first column of the first row). It is noted that the $L_2$ pointer also points at the corresponding auxiliary memory bit storage location whose contents register whether or not information has priorly been written into the location in the display memory. The process thereupon advances to subroutine 203.

In subroutine 203, memory processor 101 obtains the bit stored at location $L_2$ in auxiliary memory 104 and comperes its value or condition with the condition of the flag bit. The process thereupon advances to decision 204.

If the condition of the bit in the auxiliary memory 104 is the same as the flag bit indicating that the corresponding location in display memory 103 is "empty", the process advances to subroutine 205. In accordance with this subroutine, the contents of location $L_1$ in the frame memory are moved to location $L_2$ in display memory 103. At the same time a bit having a condition inverse to the flag bit is inserted into location $L_2$ in auxiliary memory 104 to indicate thereafter that the display memory location is "full". The process thereupon advances to decision 206. Alternatively, if the condition of the bit stored in location $L_2$ of auxiliary memory 104 does not compare with the flag bit indicating that the corresponding location in display memory 103 is "full", decision 204 instructs the process to advance to decision 206.

In decision 206, the process is advanced to subroutine 207 if pointer $L_2$ does not point to the last column of the current row of display 103 for storing the presently identified page. In subroutine 207, pointer $L_1$ is advanced to point to the next adjacent column position on this same row of the page in frame memory 102 and pointer $L_2$ is advanced to correspondingly point to the next adjacent column position in the display memory. The process then advances back to subroutine 203 to write (or not write) the contents of the next adjacent column position of the page in frame memory 102 into display memory 103.

Returning now to decision 206, in the event that pointer $L_2$ points to the last column of the row of display memory 103 for storing the page, the process advances to decision 208. Determination is now made as to whether pointer $L_2$ points to the last row of display memory 103 for storing the page. In the event that pointer $L_2$ does not currently point to the last row, the process advances to subroutine 209. In subroutine 209 pointer $L_2$ is reset to point to the first column position of the next adjacent row for storing the page in display memory 103 and pointer $L_1$ is correspondingly set to point to the first column position of the next adjacent row of the page in frame memory 102. The process then advances back to subroutine 203.

Alternatively, in the event that pointer $L_2$ points to the last row, decision 208 advances the process to exit point 210. At exit point 210, the process returns to subroutine 201 to identify the next page to be displayed. In the event that the last or bottom page has been transferred to display memory 103, the process is arranged to initiate the writing of the background information as described below.

The flowchart from the algorithm for the writing of the background information is shwon in FIG. 3. As noted above, when the process for moving a page from frame memory 102 to display memory 103 advances to exit point 210 and in the event that the page constitutes the last or bottom page, the process advances to initiating the writing of the background information and, more specifically, advances to subroutine 301. In accordance with subroutine 301, pointer $L_2$ is reset to point to the first location in display memory 103 and thus correspondingly point to the corresponding bit storage position in auxiliary memory 104, which storage position is advantageously the first column position of the first row position of auxiliary memory 104. The process then advances to subroutine 302.

In accordance with subroutine 302, memory processor 101 obtains the bit stored at position $L_2$ in auxiliary memory 104. The process then advances to decision 303 which compares this bit obtained from auxiliary memory 104 with the flag bit. If the value of the bit at location $L_2$ in auxiliary memory 104 is the same as the flag bit, the process advances to subroutine 304.

In accordance with subroutine 304, memory processor 101 writes the inverse of the flag bit into location $L_2$ in auxiliary memory 104. If the flag bit constitutes a "0" bit at this time and the process has advanced to subroutine 304 because position $L_2$ in auxiliary memory 104 also contains a "0" bit, the effect of subroutine 304 is to write a "1" bit into location $L_2$ of auxiliary memory 104. The process then advances to subroutine 305 wherein memory processor 101 writes a "blank" which may constitute a blank code or "0" bits into the $L_2$ location in display memory 103. This has the effect of writing background information into this location in the display memory. The algorithm then advances to subroutine 306.

In the event that the bit at location $L_2$ of auxiliary memory 104 differ from the flag bit, decision 303 advances the algorithm to subroutine 306. This situation occurs when display information was priorly written into the $L_2$ location of display memory 103 and the inverse of the flag bit (a "1" bit) was thereby priorly inserted into location $L_2$ in auxiliary memory 104.

In subroutine 306, the pointer $L_2$ setting is incremented to point to the next column number. The algorithm is advanced to decision 307 which determines whether this would constitute a number exceeding the number of available columns. In the event that this does constitute an appropriate column number, the algorithm advances back to subroutine 302 whereby the above-described process for writing background information is repeated for this next column number.

Assume now that the process has been performed for the last column. When the algorithm advances to decision 307, it is determined that the next number exceeds the total number of columns and the algorithm advances to subroutine 308. In subroutine 308, pointer $L_2$ is set to the first column in the next successive row. The algorithm advances to decision 309 to determine whether or not this next successive row number exceeds the available number of rows in the memory. If it be determined that this is an existing row, the algorithm advances back to subroutine 302 where this first column position in this next row of auxiliary memory 104 is read and the above-described process is repeated for this specific location.

In this manner, each location in auxiliary memory 104 is read and compared with the flag bit, "1" bits are written into auxiliary memory 104 in the presence of a comparison and a blank or "0" bit is written into display memory 103 in the corresponding location. The "blank" background data is thus written into auxiliary memory 104 in these "blank" locations and all of the several locations in auxiliary memory 104 are filled with "1" bits. This process is continued until the "1" bits fill all of the columns in all of the rows of the auxiliary memory locations and at which point the algorithm advances to decision 309. It then continues to subroutine 310 whereupon memory processor 101 inverts the flag bit which, in this case, comprises changing the flag bit from a "0" bit to a "1" bit. The algorithm then advances to exit point 311, which exits the process from the background writing routine back to the page moving routine and, more specifically, advances the algorithm back to subroutine 201. Processor 101 thereupon again moves the various pages from frame memory 102 to display memory 103. It is noted here that the flag bit now constitutes a "1" bit and the auxiliary memory 104 initially has "1" bits in all of its locations.

Although a specific embodiment of this invention has been shown and described, it will be understood that various modifications may be made without departing from the spirit of this invention.

What is claimed is:

1. In a display system for processing pages of display information elements, pages being designated as being on top of or below other pages with respect to visibility upon display, a display memory (103) having a plurality of locations for storing display information elements, a display means for displaying elements stored within said display memory means (102) for containing a plurality of pages of display information elements, each of said contained elements being destined to a respective location in the display memory, and means (101) for transferring the information element of the pages from the containing means to the display memory in accordance with the element destinations and in descending order of said top/bottom designations an auxiliary memory having a plurality of storage locations which respectively correspond to separate locations of said display memory for registering in said auxiliary memory storage locations whether an information element has been transferred to corresponding locations in the display memory, and the transferring means includes means (201–210) for selecting pages for transfer from the containing means in a descending order, topmost designated page first, for writing an information element of the selected page into the destined location of the display memory when the auxiliary memory does not register that an information element has been priorly transferred to the destined location and for registering in the auxiliary memory that an information element has now been transferred to the destined location when the information element is written in such location, whereby when elements of a page are not transferred to the display memory because their destined locations in the display memory already contain elements previously transferred thereto, as ascertainable from the indications in said auxiliary memory, the non-transferred elements are not displayed by said display means and are thus hidden from view.

2. In a display system, in accordance with claim 1, wherein the transferring means prevents the writing of an information element into any location when the corresponding auxiliary memory position contains an indication that an information element has been priorly transferred to such location.

3. In a display system, in accordance with claim 2, wherein said auxiliary memory storage locations respectively contain a single bit value associated with each display memory location, a value of said respective bits representing whether or not an information element transfer to the location has already taken place.

4. In a display system, in accordance with claim 3, wherein prior to any transfer of information elements the transferring means initially sets said bit values in the auxiliary memory to indicate that no information elements have priorly been transferred to the display memory.

5. In a display system, in accordance with claim 4, wherein subsequent to the transfer or non-transfer of all elements of said selected pages, the transferring means writes background information into locations in the display memory when the auxiliary memory do not contain indications that information elements have priorly been transferred to such locations.

6. A method of processing pages of display information elements in a display system, pages being designated as being on top of or below other pages with respect to visibility upon display, which display system includes a display memory having a plurality of locations and for storing information elements, a display means for displaying said information elements stored in the display memory and means for containing a plurality of pages of information elements, information elements of said contained pages to be transferred or non-transferred from said containing means to specific locations of the display memory in accordance with registered indications in an auxiliary memory having a plurality of storage locations which respectively correspond to separate locations of said display memory for registering in said auxiliary memory storage locations whether an information element has been transferred to corresponding locations in the display memory, the method comprising the steps of:

selecting pages in the page containing means in descending order, topmost designated page first, writing an information element of the selected page into a specific location of the display memory when the corresponding location in the auxiliary memory does not contain an indication that an information element has been priorly transferred to said specific display memory location, and registering an indication in the corresponding location in the auxiliary memory of said specific location in the display memory that an information element has now been transferred said specific location in the display memory repeating said writing and registering steps above for each element of a selected page and of each succeeding page, in corresponding sequence of page selection, whereby when elements of a page are not written into specified locations of the display memory because the corresponding locations in the auxiliary memory contain indications that said specified locations already contain information elements written therein, the non-written elements are not displayed by said display means and are thus hidden from view.

7. A method of processing pages of display information in accordance with claim 6 and further comprising the step of preventing the writing of the information element into the specific location of the display memory when the corresponding location in the auxiliary memory contains an indication that an information element has priorly been transferred to the display memory location.

8. A method of processing pages of display information in accordance with claim 7 and further comprising the step of inserting background information into each location of the display memory, of which the corresponding location in the auxiliary memory does not contain an indication that an information element has been priorly transferred to such location.

9. A method of processing pages of display information in accordance with claim 8 and further comprising the step of registering in the corresponding locations in the auxiliary memory an indication that an information element has been transferred to the display memory location when background data is inserted into such location.

10. A method of processing pages of display information in accordance with claim 9, wherein the auxiliary memory contains a plurality of bit locations each respectively corresponds to a separate display memory location and individually storing a separate bit value each value of said bits representing whether or not an information element transfer to such location has priorly taken place and wherein each such bit values represents an opposite transfer condition during alternate cycles of transferring all of the selected pages.

* * * * *